United States Patent [19]

Baues

[11] 4,389,655

[45] Jun. 21, 1983

[54] OPTICAL DEVICE FOR NON-CONTACT RECORDING AND PARTICULAR FACSIMILE REPRODUCTION OF IMAGES AND TEST

[75] Inventor: Peter Baues, Krailling, Fed. Rep. of Germany

[73] Assignee: Siemens Aktiengesellschaft, Berlin & Munich, Fed. Rep. of Germany

[21] Appl. No.: 184,002

[22] Filed: Sep. 4, 1980

[30] Foreign Application Priority Data

Sep. 21, 1979 [DE] Fed. Rep. of Germany ....... 2938301

[51] Int. Cl.³ ............................................... G01D 9/42
[52] U.S. Cl. ..................................... 346/107 R; 355/1
[58] Field of Search ....................... 346/107 R; 354/4; 355/1; 358/302, 901; 350/96.20, 96.21

[56] References Cited

U.S. PATENT DOCUMENTS

| 4,076,378 | 2/1978 | Cole | 350/92.24 |
| 4,079,404 | 3/1978 | Comerford et al. | 350/96.11 X |
| 4,257,071 | 3/1981 | Lamb | 358/286 |
| 4,268,113 | 5/1981 | Noel | 350/96.20 |
| 4,275,962 | 6/1981 | Midorikawa et al. | 355/1 |

OTHER PUBLICATIONS

Grupen et al., Stand und Entwicklungstendenzen der Faksimiletechnik" Bundesministerium fur Forschung und Technologie, T 77-33, Nov. 1977, pp. 124-135.
C. M. Schroeder, Accurate Silicon Spacer Chips for an Optical-Fiber Cable Connector", The Bell System Technical Journal, vol. 57 No. 1, Jan. 1978, pp. 91-97.

Primary Examiner—John Gonzales
Attorney, Agent, or Firm—Hill, Van Santen, Steadman, Chiara & Simpson

[57] ABSTRACT

An optical device for non-contact recording image information on a recording material which is in the shape of a cylindrical configuration by a recording head which has a plurality of light waveguides in the form of glass fibers having entrance ends receiving modulated light from individual sources and exit ends facing the recording material and being densely packed in a linear arrangement characterized by the recording head including at least one adjustment plate having a plurality of individual grooves with one groove being provided with each of the waveguides which are secured therein with the exit ends being oriented in a line extending parallel to the cylindrical axis of the material and the recording head including a light source member containing the individual light sources for each of the waveguides arranged at the spacing corresponding to the spacing at the entrance ends of the waveguides so that when the member is secured to the recording head, the individual light sources are aligned with the respective entrance ends of the fibers. Preferably the recording head extends the length of the cylindrical material and is formed by a plurality of individual sub-recording heads which are in at least two rows and are spaced apart in each row by spacing members with the sub-recording heads of one row being arranged between the sub-recording heads of the other row.

19 Claims, 9 Drawing Figures

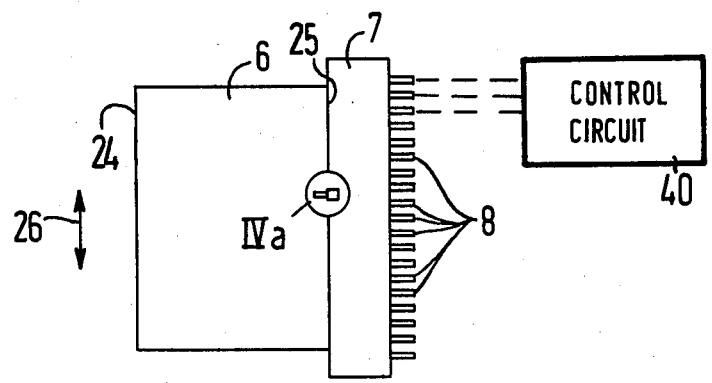
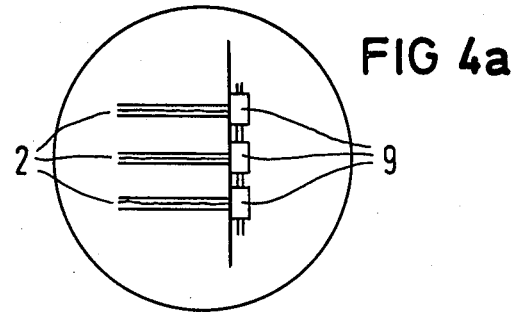
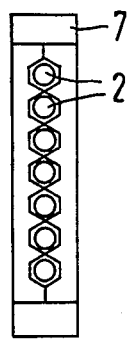
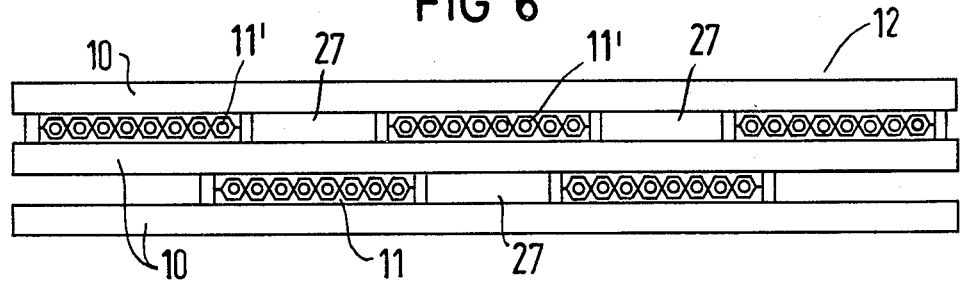

OPTICAL DEVICE FOR NON-CONTACT RECORDING AND PARTICULAR FACSIMILE REPRODUCTION OF IMAGES AND TEST

BACKGROUND OF THE INVENTION

The present invention is directed to an optical device for non-contact recording and in particular facsimile reproduction of images and text in which a sheet type recording material or medium is stretched on a cylinder or in which the cylinder functions as a temporary recording carrier.

The majority of the devices employed at the present time for facsimile reproduction function with an electro-mechanical ink jet or vapor system utilizing normal paper or on an electro-sensitive basis with a recording needle or stylus and metal paper. In another type of facsimile reproduction utilizes electrolysis in conjunction with chemically prepared moist paper. Another frequently employed principle is electrophotography in which a charge is applied on a dielectric paper and rendered visible by treatment with a toner. These various devices are discussed by P. Grupen et al., "Stand and Entwicklungstendenzen der Faksimiletechnik," *Bundesministerium fur Forschung and Technologie, Forschungsbericht T77-33*, Nov. 1977, pages 124-135.

The various devices constructed according to the above-mentioned principles either are relatively slow, have a high cost or are dependent upon the utilization of special paper which in the case of chemically prepared paper possesses a poor storage capability. Moreover, in the case of these known apparatus, the great space requirements of the appartus is a disadvantage.

SUMMARY OF THE INVENTION

The present invention is directed to producing an optical device for non-contact production of images and text which has a minimum space requirement. For example, the space requirement for a conventional typewriter and the apparatus can be produced economically.

The objects of the present invention are accomplished in an improvement for an optical display device having a cylindrical recording carrier which may either be stretched on a cylinder or be the surface of the cylinder itself, which acts as a temporary recording medium, a recording head having a plurality of light waveguides in the form of glass fibers having exit ends and entrance ends, said recording unit being mounted with the exit ends facing the cylindrical carrier surface and extending linearly with a dense packing adjacent one another, each of said entrance ends of the fibers being in communication with a light source for receiving modulated light to transmit along the fiber to the exit end. The improvement comprises the recording head including at least one adjustment plate having a plurality of individual grooves with one groove being provided for each of the waveguides, said waveguides being secured in said grooves with the exit ends being oriented in a line extending parallel to the axis of the cylindrical carrier in a fixed true to size relationship, said recording head including a light source member secured thereon, said light source member having an individual light source for each of the waveguides and means enabling individual exciting of each of the light sources in accordance with the image information to be produced, said individual light sources being arranged to have a spacing corresponding to the spacing of the entrance ends of said waveguides so that when secured to the recording head, the individual light sources are aligned with the respective entrance ends of the fibers.

The inventive optical device offers the advantage that an economical space saving device for facsimile reproductions can be realized.

In various embodiments, the means enabling individual exciting of each of the light sources includes a multi-point connector containing the necessary electrical connections for each individual light source. The adjustment plate arrangement can be either a single plate having deep grooves of a depth equal to the diameter of the fibers so that the fibers are placed in the grooves and are held there by a planar cover plate, a pair of plates with each plate having grooves and the plate arranges with the grooves of one plate facing the grooves of the opposite plate and arranged in pairs of grooves for receiving a fiber in each pair of grooves or a pair of plates with each plate having a groove for half of the fibers forming the waveguides of the recording head and the plates being positioned together with the grooves of one plate facing the grooves of the other plate and being disposed therebetween to form two rows of grooves with the fibers being in said groove forming two closely spaced rows with adjacent fibers being in different rows. In each of the embodiments, the plate as well as the member are secured together and encapsulated in the resinous potting material. The recording head on a surface facing the cylindrical surface has a concave surface having a radius of curvature greater than the radius of curvature of the cylinder by an amount equal to the spacing therebetween. In the embodiment having two rows of fibers, the member has two rows of light sources. In each of the members, the light sources may be formed by incandescent lamps, laser diodes or light emitting diodes which diodes were formed in a chip of semiconductor material by appropriate semi-conductor technology.

Each of the plates is preferably of a semiconductor material such as Si, GaAs, or GaP, and the grooves are preferably formed by being photolithographically etched into the surface of the semiconductor material forming the plates. The grooves can be formed as being parallel or can be diverging from the end adjacent the exit ends towards the entrance ends so that a small spacing between the exit ends can be obtained while still having a sufficiently large spacing at the entrance end to enable positioning the light sources thereat.

The recording head may extend the full length of the recording material or carrier and may be formed of a plurality of sub-recording heads which are arranged in at least two rows that are separated by spacing members with the recording heads in each row being spaced apart by spacing members and the sub-recording heads in one row overlapping the spacing members and portions of the recording heads in the other row.

BRIEF DESCRIPTION OF THE DRAWINGS

FIG. 4 is a plan view of the recording head in accordance with the present invention;

FIG. 4a is an enlarged view taken in the circle IVa in FIG. 4;

FIG. 5 is an end view of the recording head of FIG. 4;

FIG. 6 is an end view similar to that of FIG. 5 of a multi-recording head having a plurality of individual sub-recording heads;

DESCRIPTION OF THE PREFERRED EMBODIMENTS

Figure 1:
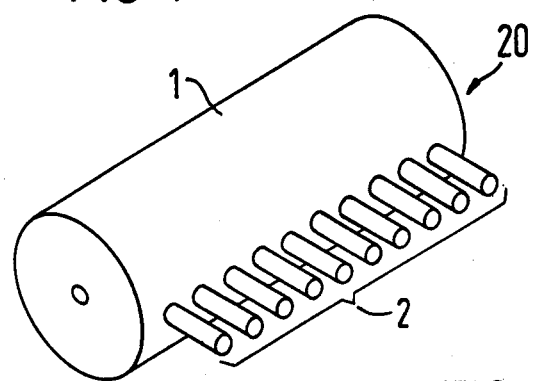
FIG. 1 is a schematic illustration of a device in accordance with the present invention.

The principles of the present invention are particularly useful in a recording device generally indicated at 20 and schematically illustrated in FIG. 1. The device 20 has a cylinder 1 with a linear array of light waveguides 2 positioned in a line extending therealong. In the device of the present invention, two different recording principals, namely the principal electro-photography or photography can be utilized. In electro-photography, it can be employed in a manner of a full surface electrical charge being applied to a carrier which is either a sheet of paper having a ZnO coating or a surface of a cylinder which has either an Se or $As_2Se_3$ surface. By projecting light through the waveguides 2, partial discharge will occur depending upon the amount of light. Then the carrier is treated with a toner and, in the case of a cylinder the toner is subsequently transferred or printed onto normal paper. The partial discharge through light takes place with the aid of the inventive optical device which will be described hereinbelow.

The partial discharge operation necessary in the case of electro-photography takes place with the light waveguides 2 being arranged in a line which is in front of the cylinder 1 and extends along an axial direction. The light waveguides 2, which may be either waveguides with a stepped profile or waveguides with a gradient profile, lie directly adjacent to one another with a packing density, for example, of eight waveguides per millimeter. For a narrow side of DIN-A-4 sheet and for a given resolution, 1728 light waveguides are required.

To obtain a precise true to size arrangement of the light waveguides 2, adjustment plates are utilized. These adjustment plates can be of a semi-conductor material such as Si, GaAs, or GaP into which grooves are etched by a photolithographic technique. The manufacturer of these plates are discussed by C. M. Schroeder "Accurate Silicon Spacer Chips for an Optical Fiber Cable Connector," *The Bell Systems Technical Journal,* vol. 57, no. 1, January 1978, pages 91–97.

Other materials can also be utilized for the adjustment or alignment plates. Accordingly, other methods of manufacture for forming the grooves can be employed depending on the material selected for the plate.

Figure 2:
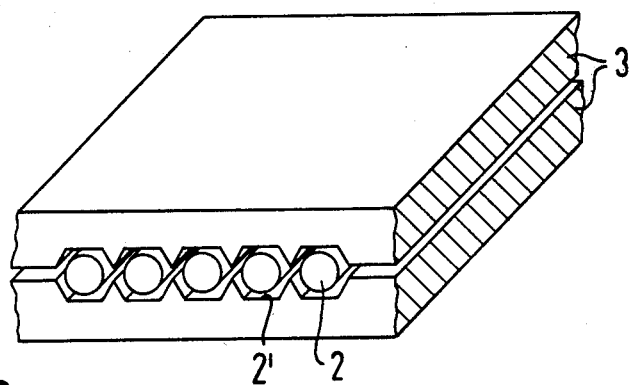
FIG. 2 is a perspective view showing a pair of adjustment plates in accordance with the present invention.

As illustrated in FIG. 2, a plurality of waveguides 2 are arranged between a pair of plates 3. Each of the plates 3 have grooves 2' which extend parallel to each other and are identical. The plates 3 are arranged with the grooves facing each other and forming groove pairs which receive an individual light waveguide 2.

Figure 3:
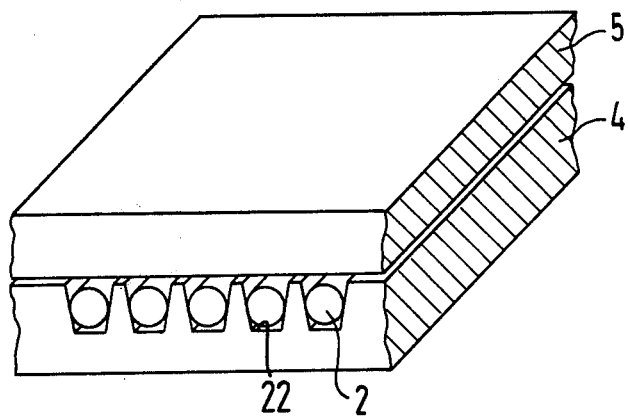
FIG. 3 shows an embodiment of the adjustment plate with a cover plate in accordance with the present invention.

In the embodiment illustrated in FIG. 3, a plate 4 has grooves 22 which have a depth and width equal to the diameter of each of the waveguides 2 so that the waveguides are entirely received therein. After inserting the waveguides 2 in the grooves 22 of the plate 4, a plane cover plate 5 can be placed to cover the grooves of the plate 4.

After assembling the waveguides 2 into the grooves of the respective plates such as the plates 3 of FIG. 2 or the plates 4 with the cover 5 of FIG. 3, the plates are preferably cemented together with a synthetic resin. Then subsequently from the solid block being formed, an end is cut off in a plane perpendicular to the light waveguides 2 to form a front end surface 24 of the recording head 6 and a back end or rear end surface 25. After cutting, the surfaces are polished. One of the two surfaces such as the front end surface 24 will be opposite an electro-photographic cylinder 1 the other surface will receive a light source member 7, which has an individual light source such as a light emitting diode or LED 9 (FIG. 4a) for each of the waveguides 2. In addition, the member 7 will have a multipoint connector 8, which enables connecting the individual light sources to an energizing or control circuit 40 which may be a microprocessor or a micro-computer arrangement.

The member 7 may contain a chip of semi-conductor material. The light emitting diodes LED 9 are integrated on the chip by semi-conductor technology. The diodes 9 are formed with a desired spacing so that when the member 7 is secured to the head 6, the diodes 9 are aligned with the entrance end of each of the fibers 2.

While the light sources can be realized in a form as LED's, they can also be formed in the form of semi-conductor laser diodes which preferably can be integrated onto a semi-conductor chip utilizing semi-conductor technology. The light source also can be incandescent lamps. The light intensity of the light source is electrically modulated corresponding to the printed image to be produced.

The adjustment plates for enclosing the waveguides 2 forming the head 6 and the light source member 7 arranged thereon are subsequently encapsulated or casted in a synthetic resin together with the multiple connection preferably a multipoint connector 8 which corresponds to the number of light sources. This arrangement forms a single recording head. If desired, the surface 24 can be provided as a concave cylindrical surface with the axis of the concave cylindrical surface extending parallel to the length indicated by the arrow 26. The cylindrical surface will have a radius of curvature which is the same as that of the cylinder 1 plus the additional minimum spacing between the surface 24 and the surface of the cylinder.

Due to the surface limitations of the photolithographic techniques, only a portion of the total 1728 light waveguides can be accommodated. Therefore, in order to produce a recording head for the entire length of the cylinder 1, a plurality of individual recording heads or sub-recording heads 11 are utilized with each of these recording heads 11 being the same as the head illustrated in FIG. 4. By utilizing a plurality of individual recording heads 11, a so-called multi-recording head 12 can be formed (see FIG. 6). The multihead 12 has the plurality of sub-recording heads 11 arranged in two rows which are separated by support bars or plates 10 with the sub-recording heads 11 in each row separated by spacing members 27 whose width is less than the width of the head 11. Thus, the head 11 of the first row overlaps a spacing member 27 and portions of the sub-recording heads 11' of the second row as illustrated in FIG. 6 by the side or edge facing the cylinder. The supporting bars 10 preferably are of a synthetic plastic material. The entire arrangement of the multi-recording head is then cast in a synthetic resin. In the case that it is necessary that more than two rows of individual recording heads 11 can be fixed between a correspondingly large number of support bars in an offset arrangement. The arrangement of the individual recording heads 11 is several rows makes necessary, corresponding to the rotational speed of the cylinder, a chronological offset actuation of the sequential line or rows of individual recording heads 11. The chronological spacing or interval of the lines results from a rotational speed of the cylinder 1 and can be realized by means of suitable controls such as provided by micro-computer in the control 40.

Figure 7:
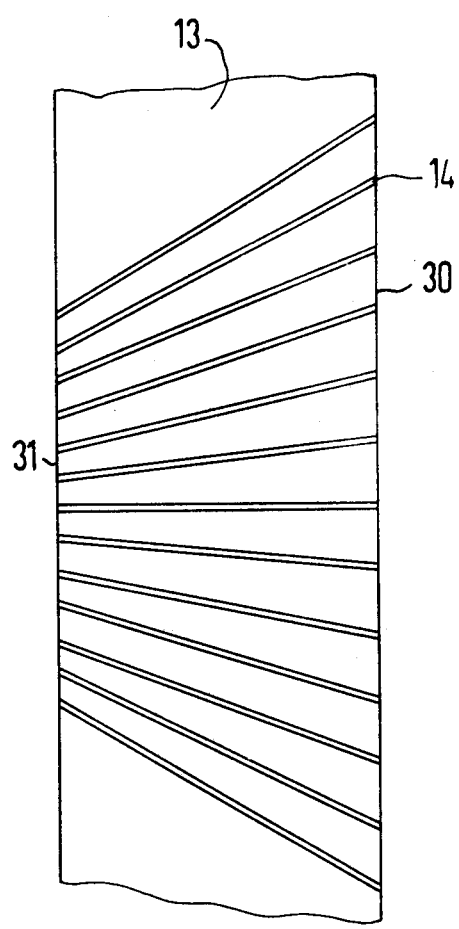
FIG. 7 is a plan view of an adjustment plate having converging grooves.

In order to manufacture individual recording heads 11, adjustment plates with etched in grooves are required. These grooves for receiving the light waveguides need not be parallel as disclosed in the embodiments of the plates in FIGS. 2 and 3. As illustrated in FIG. 7, a plate 13 has grooves 14 which have a fan shape and converge from a surface or edge 30 towards the surface 31. In this arrangement, the surface 31 can be the exit end of the light waveguides and enables a close spacing between the various waveguides while the surface 30 can be adjacent the entrance end which provides a larger spacing between adjacent waveguides to enable having sufficient space for the individual light sources.

Figure 8:
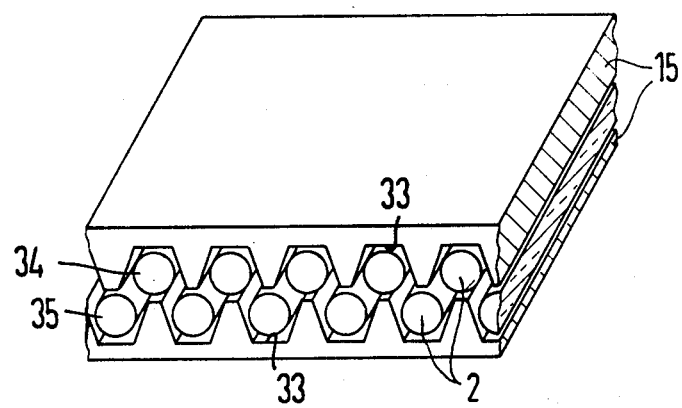
FIG. 8 is a perspective view of a pair of adjustment plates providing a pair of closely spaced rows of waveguides.

Another embodiment of the guidance plates 15 are illustrated in FIG. 8. Each of the plates 15 have grooves 33, which are deep enough to receive a waveguide 2. Each of the plates has grooves for half of the total of waveguides to be used and are assembled together with the groove in one plate being offset relative to the grooves of the other plate to form two rows of light waveguides 2 with the light waveguides in a first row 34 being offset from the second row 35. Such an arrangement has the advantage that the light waveguides can have a greater diameter than in the case of a single layer arrangement and as a consequence makes possible an overlapping which prevents a fringing on the recording material.

Although various minor modifications may be suggested by those versed in the art, it should be understood that I wish to embody within the scope of the patent granted hereon, all such modifications as reasonably and properly come within the scope of my contribution to the art.

I claim:

1. In an optical display device for non-contact recording information on a recording surface and in particular for use in facsimile reproduction of images and text, said device having a cylindrical recording carrier, a recording head having a plurality of light waveguides in the form of glass fibers having exit ends and entrance ends, said recording head being fixedly mounted with the exit ends facing the cylindrical carrier surface and extending linearly with a dense packing adjacent one another, said entrance end of each of the fibers being in communication with a light source for receiving modulated light to transmit along the fiber to the exit end the improvements comprising the recording head including a pair of adjustment plates having a plurality of individual straight grooves of sufficient size to entirely receive a single waveguide fiber, said grooves extending inward from one edge surface of each plate, each plate having grooves for half of the fibers forming the waveguides of the recording head, said waveguides being secured in said grooves with the exit ends being adjacent said one edge surface and being oriented in a line extending parallel to the axis of the cylinder, said straight grooves of each adjustment plate converging from a point adjacent the entrance end of each of the fibers towards the one edge surface having the exit ends so that the spacing between the exit ends of each of the fibers is substantially smaller than the spacing between the entrance ends to enable obtaining a maximum resolution of the image information being recorded on said recording surface while maintaining space for the light sources, said plates being positioned together with the grooves of one plate facing the grooves of the other plate and being disposed therebetween to form two rows of grooves with each plate having portions between adjacent grooves being aligned with the grooves of the opposite plate to act to partially close the grooves of the opposite plate, said fibers in said grooves forming two closely spaced rows with adjacent fibers being in different rows, said recording head including a light source member secured thereon, said light source having an individual light source for each of the waveguides and means enabling individual exciting of each of the light sources in accordance with the image information to be produced and being a multipoint connector containing the necessary electrical connections for each individual light source, said light sources being arranged in two rows with a spacing corresponding to the spacing of the entrance ends of the fibers and with the sources in one row being slightly offset with respect to the sources of the other row the same amount as said fibers so that with the securing of the light source member onto the recording head, the individual light sources are aligned with the respective entrance ends of the fibers, said plates and said member being encapsulated in a resinous potting material, and said recording head having a concave surface facing the cylindrical surface, said concave surface having a radius of curvature greater than the radius of curvature of the cylinder by an amount equal to the spacing therebetween.

2. In an optical display device for non-contact recording information on a recording surface and in particular for use in facsimile reproduction of images and text, said device having a cylindrical recording carrier, a recording head having a plurality of light waveguides in the form of glass fibers having exit ends and entrance ends, said recording head being fixedly mounted with the exit ends facing the cylindrical carrier surface and extending linearly with a dense packing adjacent one another, said entrance end of each of the fibers being in communication with a light source for receiving modulated light to transmit along the fiber to the exit end the improvements comprising the recording head being a multi-recording head of individual sub-recording heads, said individual sub-recording heads being arranged in at least two rows separated from one another by a support member of synthetic material, adjacent individual sub-recording heads in each row being spaced from each other by spacing members with the sub-recording heads of one row overlying the spacing members of the other row and being offset from the sub-recording heads of said other row, each of said sub-recording heads including at least one adjustment plate having a plurality of individual grooves extending inward from one edge surface of the plate with one groove being provided for each of the waveguides, said waveguide being secured in said grooves with the exit ends being adjacent said one edge surface and being oriented in a line extending parallel to the axis of the cylindrical carrier in a fixed true-to-size relationship, and each of said sub-recording heads including a light source member secured thereon, said light source member having the individual light sources for each of the waveguides and means enabling individual exciting of each of the light sources in accordance with the image information to be produced, said individual light sources being arranged at a spacing corresponding to the spacing of the entrance ends of said waveguide so that when secured to the recording head, the individual light sources are aligned with the respective entrance ends of the fibers.

3. In an optical device according to claim 2, wherein the multi-recording head has a length corresponding to the entire length of the cylindrical recording carrier.

4. In an optical device according to claim 2, wherein the multi-recording head exhibits a plurality of layers so that the totality of the light exit ends of all light waveguides represents at least two lines of respective images for recording.

5. In an optical device according to claim 2, wherein the means for energizing the individual light sources for each of the waveguides of each of the sub-recording heads are energized in a chronological offset fashion corresponding to the rotational speed of the cylinder.

6. In an optical device according to claim 5, wherein the chronological offset excitation of the respective light sources is controlled by means of a micro-computer arrangement (using e.g. the Inlet 8080 or Inlet 8060).

7. In an optical device according to claim 2, wherein each of the sub-recording heads utilizes two adjustment plates having the same groove structure, said plates being arranged with the grooves facing each other in aligned pairs for receiving the waveguides.

8. In an optical device according to claim 2, wherein each of the sub-recording heads includes a single adjustment plate having grooves of a depth equal to the diameter of the light waveguides and a plane cover plate which is utilized to close said grooves after insertion of the waveguides.

9. In an optical device according to claim 2, wherein each of the light waveguides is an optical fiber having a stepped index profile.

10. In an optical device according to claim 2, wherein each of the light waveguides is an optical fiber having a gradient index profile.

11. In an optical device according to claim 2, wherein the light sources are in the form of incandescent lamps.

12. In an optical device according to claim 2, wherein each of the light sources is realized in the form of a light emitting diode.

13. In an optical device according to claim 12, wherein the light source member includes a chip of a suitable semi-conductor material, each of said light emitting diodes being integrally formed in said chip in a row by suitable semi-conductor technology.

14. In an optical device according to claim 2, wherein each of the light sources is in the form of a semi-conductor laser.

15. In an optical device according to claim 14, wherein the light source member includes a chip consisting of a suitable semi-conductor material, each of said semi-conductor laser diodes being integrally formed in said chip in a row by the aid of semi-conductor technology.

16. In an optical device according to claim 2, wherein each of the adjustment plates consist of a semi-conductor material composed of silicon, said plates having the grooves photolithographically etched therein.

17. An optical device according to claim 2, wherein each of the adjustment plates is composed of a semi-conductor material, said semi-conductor material being GaAs, said grooves being photolithographically etched into the surface of said each plate.

18. In an optical device according to claim 2, wherein each of the plates is composed of a semi-conductor material of GaP and each of the grooves is photolithographically etched therein.

19. In an optical device according to claim 2, wherein the grooves on each adjustment plate converge from adjacent the entrance end of each of the fibers towards the one edge surface having the exit ends so that the spacing between the exit ends of each of the fibers is substantially smaller than the spacing between the entrance ends to enable obtaining a maximum resolution of the image information being recorded on said material while maintaining space for the light sources.

* * * * *